United States Patent
Berman et al.

[11] Patent Number: 6,134,345
[45] Date of Patent: Oct. 17, 2000

[54] COMPREHENSIVE METHOD FOR REMOVING FROM AN IMAGE THE BACKGROUND SURROUNDING A SELECTED SUBJECT

[75] Inventors: Arie Berman, Chatsworth; Paul Vlahos, Tarzana; Arpag Dadourian, Northridge, all of Calif.

[73] Assignee: Ultimatte Corporation, Chatsworth, Calif.

[21] Appl. No.: 09/141,703

[22] Filed: Aug. 28, 1998

[51] Int. Cl.⁷ ............................................. G06K 9/00
[52] U.S. Cl. ................................. 382/162; 382/167
[58] Field of Search .......................... 382/162, 163, 382/167, 282; 348/584, 586, 587, 590, 591, 592, 650; 345/114, 473

[56] References Cited

U.S. PATENT DOCUMENTS

| | | | |
|---|---|---|---|
| 5,400,081 | 3/1995 | Chaplin ................................. | 348/587 |
| 5,469,536 | 11/1995 | Blank .................................... | 395/131 |
| 5,519,826 | 5/1996 | Harper et al. ......................... | 395/152 |
| 5,687,306 | 11/1997 | Blank .................................... | 395/135 |
| 5,907,315 | 5/1999 | Vlahos et al. ........................ | 345/114 |

*Primary Examiner*—Phuoc Tran
*Attorney, Agent, or Firm*—Blakely Sokoloff Taylor & Zafman

[57] ABSTRACT

In most cases, the estimated subject color and/or the estimated background color for a given pixel will have a certain amount of error, which could result in either not enough background removal, or removal of all of the background and some of the foreground. By manually or automatically altering the estimated subject color and/or background color, the errors in matte calculation and subsequent removal of the background, can be minimized or eliminated. Manual alteration of a subject or background color is achieved by using a cursor to select a true color from the background, for example, and inserting it in one or more areas in the background area being partially obscured by the subject. Automatic alteration of one of the estimated subject or background colors involves its computation as a projection in color space of the observed transition pixel color, onto a plane defined by the subject and background reference colors or other defined planes. By treating the shadow as a semitransparent subject, a matte (alpha channel) may be generated to represent the shadow's transition densities, thus permitting the shadow to be regenerated over the new background.

25 Claims, 8 Drawing Sheets

COMPREHENSIVE METHOD FOR REMOVING FROM AN IMAGE THE BACKGROUND SURROUNDING A SELECTED SUBJECT

BACKGROUND

Rotoscoping is a motion picture process for removing an unwanted background from a photographic image. patent application Ser. No. 09/008,270 filed Jan. 16, 1998, describes a computer aided method for removing, from an image, the background surrounding a selected subject, including those elements of the background seen through transparent, semitransparent and translucent areas. (For brevity, the term semitransparent is intended to include the terms transparent and translucent.) The method also creates a matte (alpha channel) which permits later compositing of the subject over another background. The new background is visible, through semitransparent subject areas, to the extent the original background was visible. Removal of the background in semitransparent areas is especially important in motion pictures because moving subjects photographed at low shutter speeds always produce a semitransparent blurred edge.

Blurred edges are usually not a problem for still images used in graphic arts because high shutter speeds or strobe lights can eliminate unwanted movement blur. However, the referenced method is very useful for stripping or masking still images when portions of the subject are transparent, semitransparent of translucent.

The referenced method is inadequate for certain semitransparent portions of an image where good estimates of the subject and background colors could not be obtained, thus limiting its full potential. Extrapolation of these not very good estimates can therefore fail to correctly generate the required subject and background reference colors. The result is an inaccurate matte that does not match the level of, nor properly remove, the background in semitransparent areas of the subject. Every new subject, background, or camera angle, produces a difference photographic image. There can therefore exist an infinite number of images. If a new background removal method is to be accepted, it must perform well on more than a few selected images. The technology contained in the above described invention, when provided with good estimates of the subject and background colors, is sufficiently comprehensive to permit accurate extraction of a subject for almost every image.

The present invention provides improved estimates of the subject and background colors contributing to the color observed at a given pixel in transparent, semitransparent, or translucent subject areas. In this sense a shadow is a non reflective transparent subject having an inherent density greater than zero.

BRIEF SUMMARY OF THE INVENTION

In most cases, the estimated subject color and/or the estimated background color for a given pixel will have a certain amount of error, which could result in either not enough background removal, or removal of all of the background and some of the foreground.

By manually or automatically altering the estimated subject color and/or background color, the errors in matte calculation and subsequent removal of the background, can be minimized or eliminated. Manual alteration of a subject or background color is achieved by using a cursor to select a true color from the background, for example, and inserting it in one or more areas in the background area being partially obscured by the subject.

Automatic alteration of one of the estimated subject or background colors involves its computation as a projection in color space of the observed transition pixel color, onto a plane defined by the subject and background reference colors or other defined planes.

By treating the shadow as a semitransparent subject, a matte (alpha channel) may be generated to represent the shadow's transition densities, thus permitting the shadow to be regenerated over the new background.

DETAILED DESCRIPTION OF THE INVENTION

Figure 1:
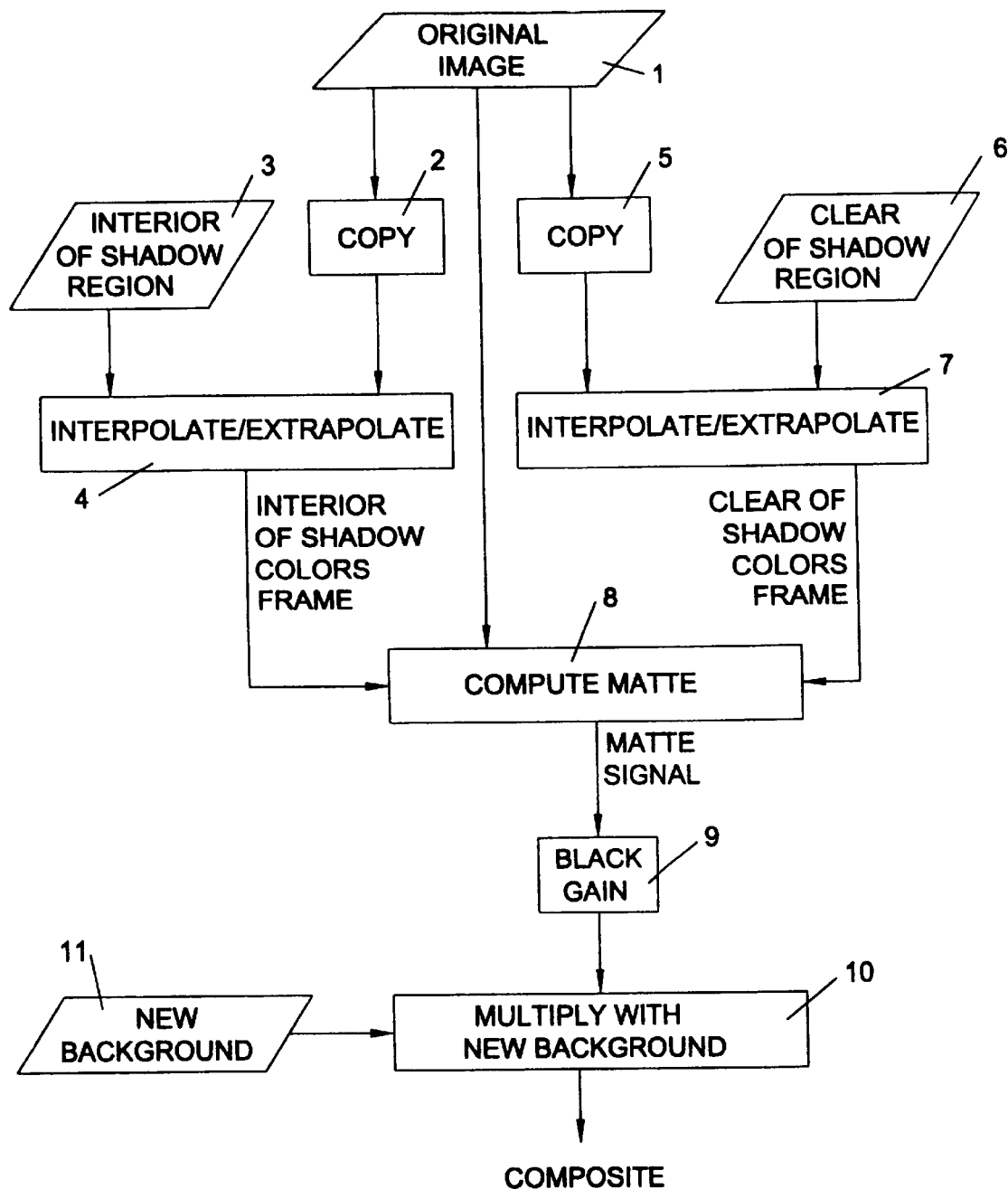
FIG. 1 is a block diagram of a basic shadow extraction process according to the present invention.

Improvements to a method for removing from an image the background of a selected subject are described in three areas; 1) manual injection of "reference" color estimates (e.g. of the true background or subject color component of a color observed in the image), 2) automatic adjustment of reference color estimates by calculation based on the original color observed in the image, and 3) shadow extraction.

Removal of the background from the image is achieved by subtracting from the image the background reference frame modulated by the matte (alpha channel). Since the matte and its generation is a frequent reference, its equation is shown here.

$$m = \text{distance}(v, vs) / \text{distance}(vc, vs) \qquad \text{Eq. 1}$$

Where;
- m=matte
- v=the observed RGB 'value' of a pixel in the image,
- vs=the RGB value of the estimated subject color contributing to the observed pixel color, and
- vc=the RGB value of the estimated background color contributing to the observed pixel color, and
- "distance" is a function yielding the distance in color space between two colors.

INJECTION OF USER ESTIMATED REFERENCE COLORS

An image is considered to consist of a composition of a user selected subject and its background. Specifically, the user can designate a region of the image as opaque subject, free of any elements of the background. This uncontaminated subject color can be referred to as the true subject color, and is also referred to as the subject reference color. This color when extrapolated into the transition area, generates the estimated subject color.

Another region may be designated as background free of any elements of the subject. This uncontaminated background color may be referred to as the true background color, or background reference color. This color when extrapolated/interpolated into the transition area, generates the estimated background color.

These regions can be designated by any region selection method such as a computer mouse, graphics tablet, or equivalent device to draw a contour enclosing the region, or by clicking a mouse button when the cursor is on a pixel to be selected, and by specifying unions and/or intersections of previously designated regions.

The edge of a subject may blur due to subject motion, or the subject itself may be partially transparent or translucent as in areas of loose hair. In these areas one sees a mixture of the subject color as well as some of the background color. The RGB color values of a pixel in this semitransparent transition area are known since the color may be observed. The boundary lines defining the reference colors are not drawn at the exact edge and therefore may not represent the color at the edge of the opaque subject, nor at the exact edge of the true background color.

Furthermore, a transition pixel may be at some distance from the true subject color and from the true background color. The actual subject color being contributed to a transition pixel may never be known, and is therefore estimated by extrapolation and a weighted average of the color of nearby pixels.

The background color contributing to a pixel in the transition may not be known since it is partially covered by the semitransparent subject, therefore this background color is estimated by interpolation/extrapolation from nearby, unobscured background pixels. From these two color estimates (subject color and background color) and from the known pixel color, the contribution of the background is calculated. If the estimates are sufficiently accurate, the calculated contribution of the background, when subtracted from the image, fully removes the background seen through semitransparent or translucent areas of the subject.

There can be subject areas of complexity sufficient to prevent the calculation of good estimates of the subject color, backing color, or both. One method of correcting this problem is by manual intervention. A cursor is used to select the true subject color, hold it in memory, and inject this color into one or many points, in selected transition areas, to improve the subject color estimate stored in a "subject reference frame" or image. When these injected subject colors—along with any previously selected opaque subject regions also stored in the "subject reference frame"—are interpolated/extrapolated into the remaining transition region, they become a part of the extrapolated subject color, generating improved subject reference color estimates.

One may also select the true background color and inject this color into selected transition areas to improve the background color estimate in a "background reference frame" or image. When these injected background colors—along with any previously selected clear background regions also stored in the "background reference frame"—are interpolated/extrapolated into the rest of the transition region, they become a part of the extrapolated background color, generating improved background reference color estimates.

The poorest estimates are generally made for the background color, since it is partially hidden by the subject, however it is possible for a poor estimate to be made for the subject color. On rare occasions, one may want to inject corrections into both subject and background color frames. For example, the hand drawn boundary line defining an opaque subject will be drawn through the opaque portion of the persons hair. But blond hair at it extremities, is translucent and glows when back lit. This lightness or glow is lost if the reference color is that of hair at the forehead. In this instance, a much lighter color than hair at the forehead is injected into lighter hair regions. The RGB levels of a selected color may be altered in luminance, hue and saturation prior to being injected, by manually altering their RGB values.

A "reference color" can be defined as a mix of known proportions of pure full background color and pure full subject color. Thus the pure full background color, or "background reference" color, is a reference color with background to subject color proportions of 1 to 0. Similarly, the pure full subject color, or "subject reference" color, is a reference color with background to subject color proportions of 0 to 1. For a specified proportion, fixed across the image, the reference color varies from pixel to pixel.

Figure 3:
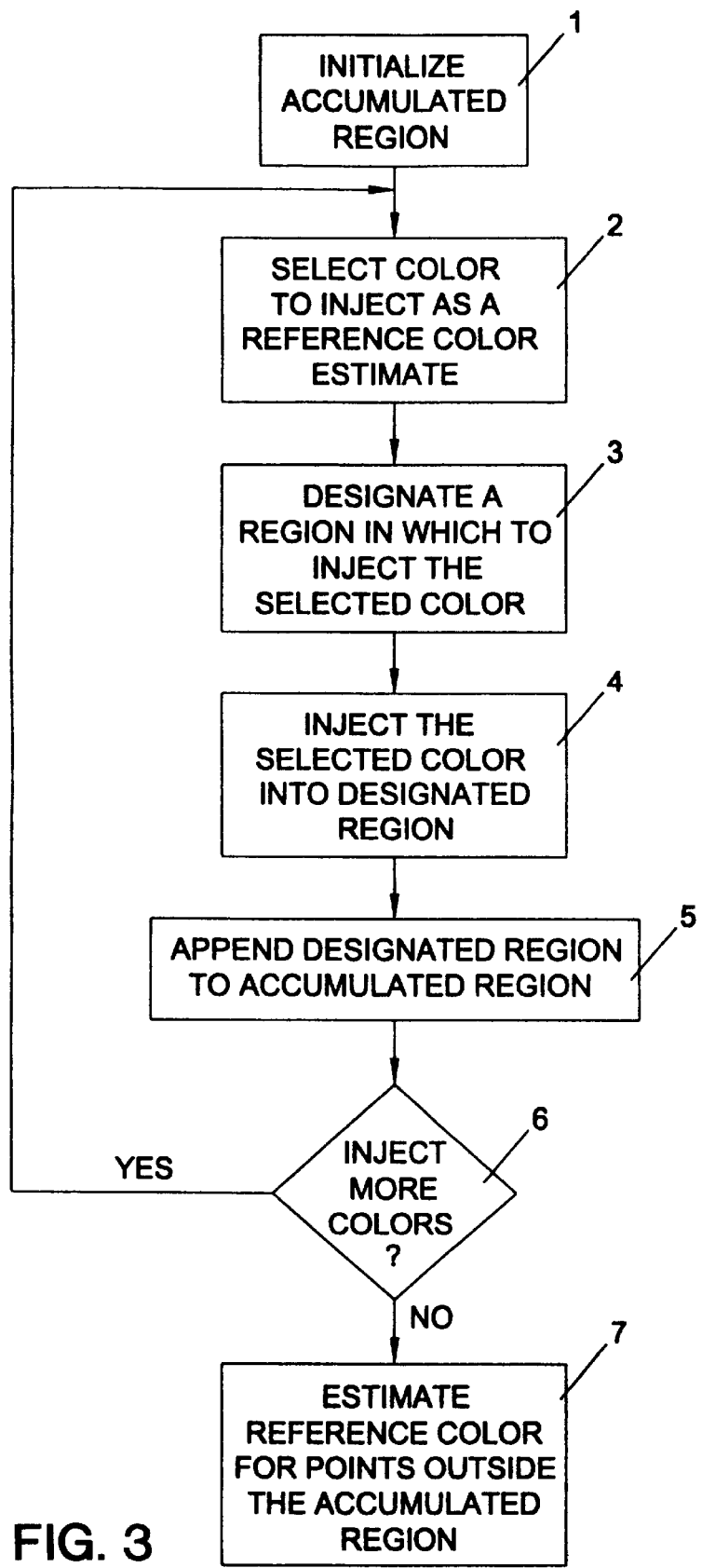
FIG. 3 is a block diagram of a procedure for injecting reference color estimates according to the present invention.

In addition to injection of background reference color estimates and subject reference color estimates, as discussed above, the user can inject estimates of reference colors of other specified proportions, which can then be interpolated/extrapolated from their respective designated injection regions into other areas in the image, estimating a reference color of the same proportions for each point in the image, optionally excluding regions in which the estimates are not relevant. FIG. 3 is a block diagram illustrating the reference color injection process. In FIG. 3, a region in which the reference colors (of specified proportions) are already known or have already been estimated, is designated as the initial "accumulated region" (block 1)A user then selects a color from a palette, or from a pixel in the original image, or otherwise (block 2). Next, the user selects or designates a region into which to inject the selected color (block 3). Next, the selected color is injected into the selected region (block 4). This means that, within the designated region, the selected color replaces the original colors in a copy of the original image. Next, the designated region is appended to, or united with (block 5), a prior region, which is an accumulation of designated regions, and this union then becomes the updated accumulated region for subsequent iterations of the process. If there are more colors to inject (block 6), this process (blocks 2 through 6) is repeated, until no more colors are selected, in which case the colors from the designated regions, or accumulated region, of the above mentioned copy of the original image can be interpolated/extrapolated (block 7) to points outside the accumulated region, and replace the original colors at those points in that copy of the original image, forming an image frame of estimated reference colors.

The physical act of injection appears to inject the selected color directly into the image on the monitor. But the color is actually injected into a reference frame, as mentioned. These reference frames contain known and estimated (primarily by interpolation/extrapolation) reference colors. The subject and background reference frames are fully discussed in the referenced patent application Ser. No. 09/008,270.

AUTOMATIC ADJUSTMENT OF REFERENCE COLORS BY USING THE OBSERVED COLOR

As already mentioned, in some cases the reference color estimates can contain a significant amount of error. As a result, the matte might be in error, and the subsequent removal or subtraction of the background component from each pixel can result in an image which is not entirely free of the true background, and may be otherwise tainted.

Furthermore, in certain situations such as bubbles reflecting one or more colors, the observed color is again a linear mix of the background showing through the bubble, and the subject colors reflected by the bubble surface. However, the initial estimates of the subject reference colors, possibly based on interpolating colors from nearby opaque regions, would probably not include the actual color or colors which are being reflected by the bubble surface, and almost certainly not in the proper distribution across the bubble area.

It is possible, however, to use the actual observed color to improve these background and subject reference color estimates, based on the understanding that the observed color should be a linear mix of these two reference colors. By so using the observed color to adjust the estimated background reference color, variations in the observed color which are due to variations in the contributing background color can be reduced, resulting in a cleaner, more accurate separation of the subject from its background. And by using the observed color to adjust the estimated subject reference color, it is possible to retain more of the colors which were not present in the initial estimate of the subject reference color, such as the colors being reflected in a bubble or other transparent and reflective surfaces.

Methods for making such automatic adjustments will now be discussed.

The observed color, the background reference color, and the subject reference color can be contemplated as points in a color space, such as a space in which each of the three color components, red, green, and blue, is represented as an independent dimension in a three dimensional space—the RGB color space. Then any linear mix of the two reference colors would be represented, in this color space, by a point on the line segment connecting the points representing the two reference colors.

Using the observed color point, the (estimated) background reference color point, and the (estimated) subject reference color point, the present invention defines strategies for relocating, in color space, the background reference color point, in a way which would bring the observed color point closer to being between (i.e. a linear mix of, or on the line segment connecting) the background and subject reference color points, while retaining some aspects of the initial estimates.

Figure 4:
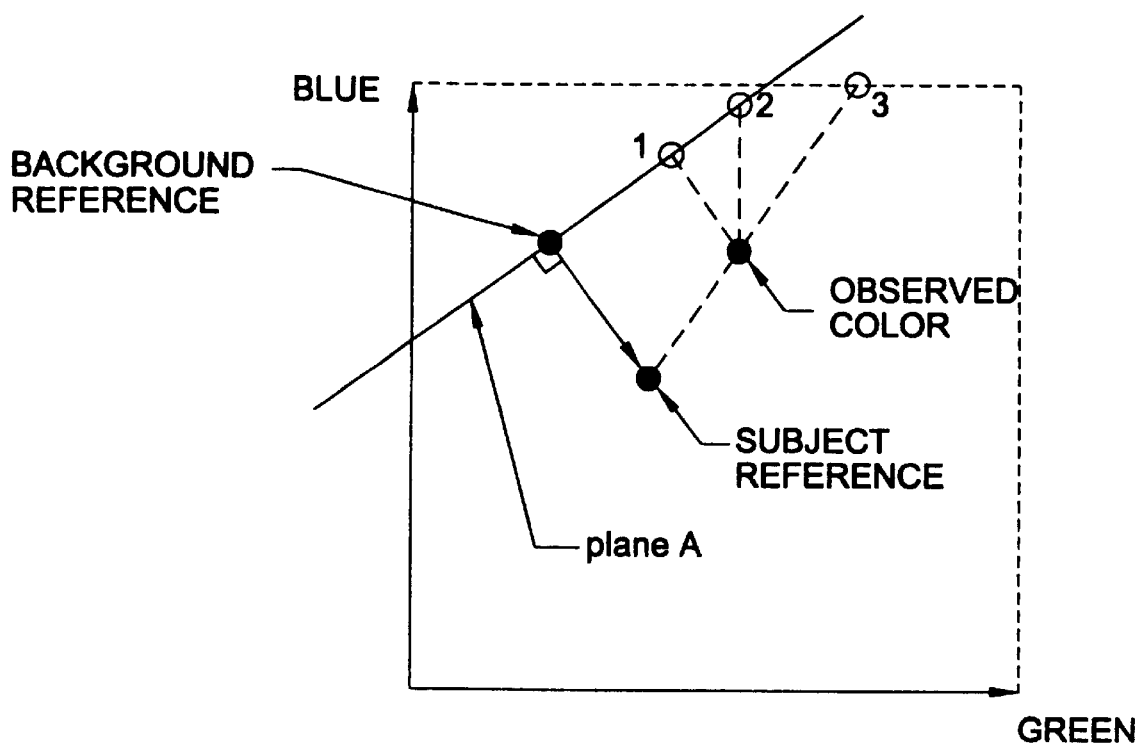
FIG. 4 is a graph of a two dimensional section of RGB color space (GB), illustrating background reference color adjustments using projection methods.

FIG. 4 shows a representation of the reference colors, observed color, and some background reference colors adjusted according to different strategies. In FIG. 4, point 1 is an adjustment based on orthogonal projection, point 2 is based on a "straight (up)" projection, and point 3 is an adjustment using the intersection of the "surface of color space" and the ray emanating from the subject reference and passing through the observed color. These strategies will be clarified in the discussion which follows. Only two dimensions of color space are shown, which within the scope of our present discussion, are sufficient to illustrate what happens in the full three dimensional color space.

One type of adjustment strategy involves selecting a new background reference color point from a plane in color space which passes through the initial background reference color point and is perpendicular to the vector connecting that background reference color point with the subject reference color point.

Specifically, we can select the orthogonal projection of the observed color point on to that plane. In mathematical terms, let v be the observed color point, let vs be the estimated subject reference color point, and let vc be the background reference color point (initial estimate).

Then the orthogonal projection of an observed color point v on to the above mentioned plane consists of adding a vector in the direction of (vc−vs) to the observed color v, and can be expressed as follows:

$$u=v+(1.0-m)(vc-vs).$$

where $m=[(v-vs)\text{dot}(vc-vs)]/[(vc-vs)\text{dot}(vc-vs)]$ and "dot" indicates the dot product operation.

u is then a new estimate for the background reference color.

Figure 5:
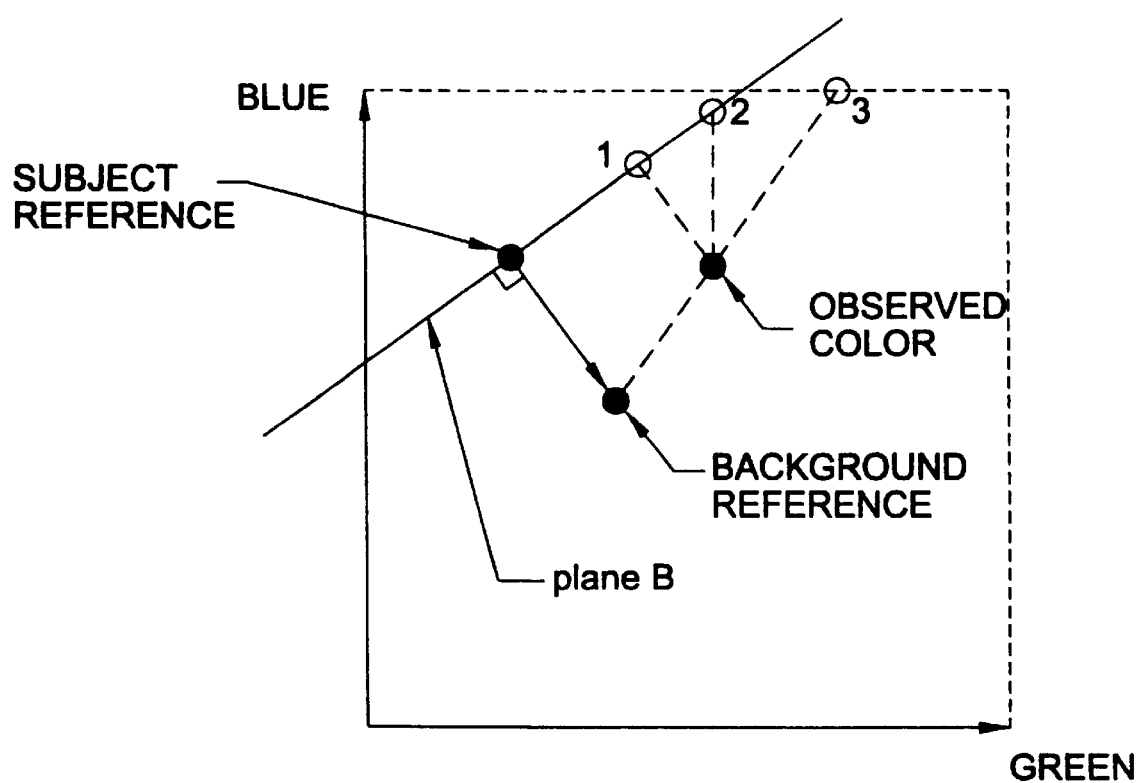
FIG. 5 is a graph of a two dimensional section of RGB color space (GB), illustrating subject reference color adjustments using projection methods.
Figure 6:
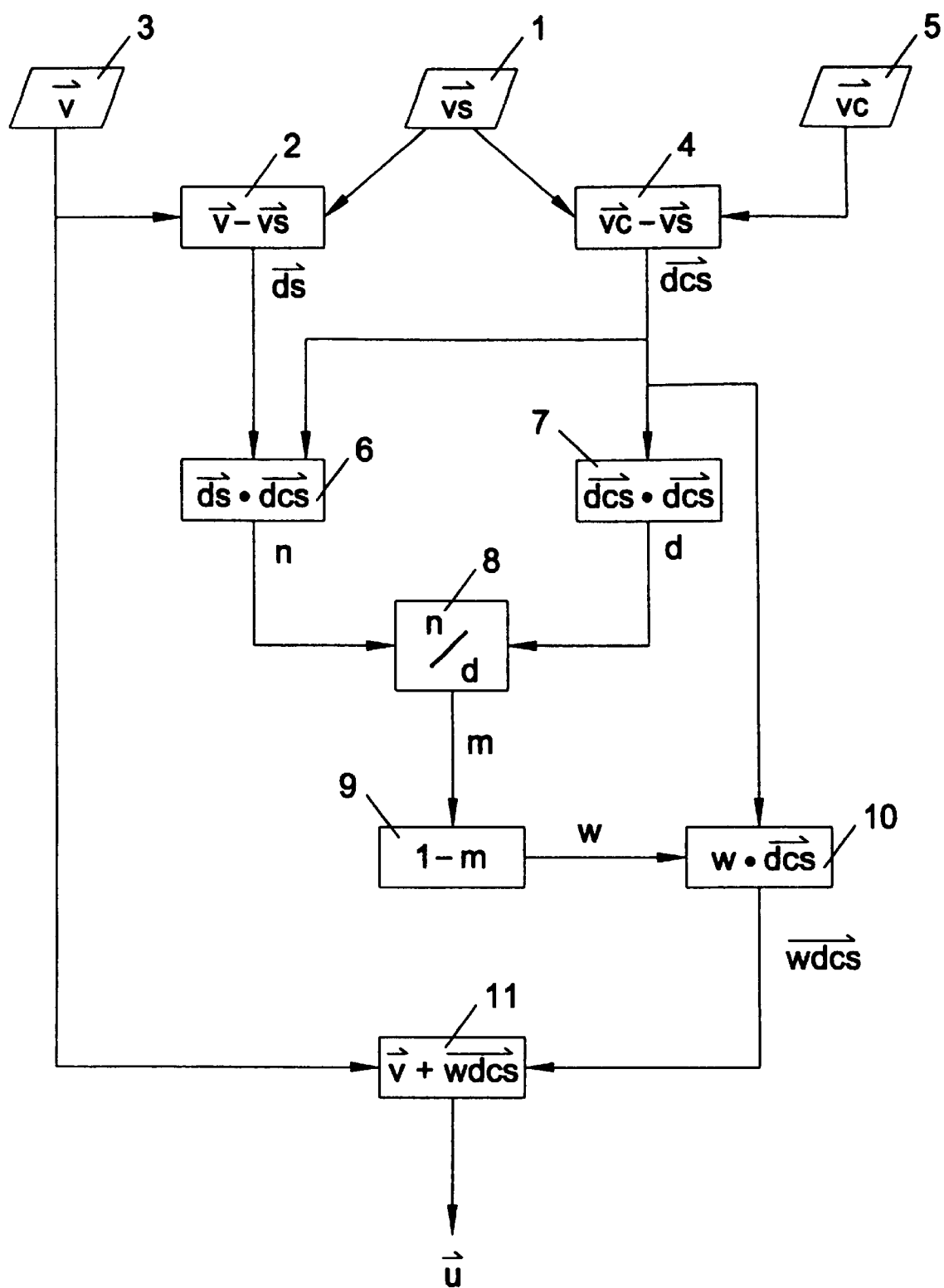
FIG. 6 is a detailed block diagram of a computation of the orthogonal projection method shown as point I in FIG. 4 and FIG. 5.

FIG. 6 is a block diagram of this computation of the orthogonal projection u of observed color point v onto the plane passing through a color point vc, such as a background reference color, and orthogonal to the difference vector vc−vs, where vs is yet another color point, such as a subject reference color. The input vector vs (block 1) is subtracted (block 2) from the input vector v (block 3), producing vector difference ds, and the input vector vs (block 1) is also subtracted (block 4) from the input vector vc (block 5), producing vector difference dcs. A dot product of ds and dcs is computed (block 6) to produce the scalar n, and a dot product of dcs with itself is computed (block 7) to produce the scalar d. The scalar n is divided (block 8) by the scalar d to produce the quotient m. The quotient m is subtracted (block 9) from 1 (one, or unity) to produce the weight w. The weight w is multiplied (block 10) by the vector dcs to produce the weighted vector wdcs. The weighted vector wdcs is added (block 11) to the input vector v to produce the adjusted output vector u (represented by point 1 of FIG. 4 or FIG. 5).

If the observed color is already a linear mix of the background reference color and subject reference color, this new estimate would coincide with the initial estimate.

Alternatively, other (non-orthogonal) projections of the observed color point on to the above mentioned plane can be defined, such as a "straight" projection, i.e. the point on the plane which is equal to the observed color point in two of the dimensions or color components, but not the third. This is illustrated by point 2 in FIG. 4. In mathematical terms, the third component is computed by solving the equation $$(u-vc)\text{dot}(vs-vc)=0,$$

where two of the components of u, the new adjusted estimate, are known (are equal to corresponding components of v). If components r and g are known, the solution for b, the third component, is $$u_b=vc_b-[(v_r-vc_r)*(vs_r-vc_r)+(v_g-vc_g)*(vs_g-vc_g)]/(vs_b-vc_b)$$

Figure 7:
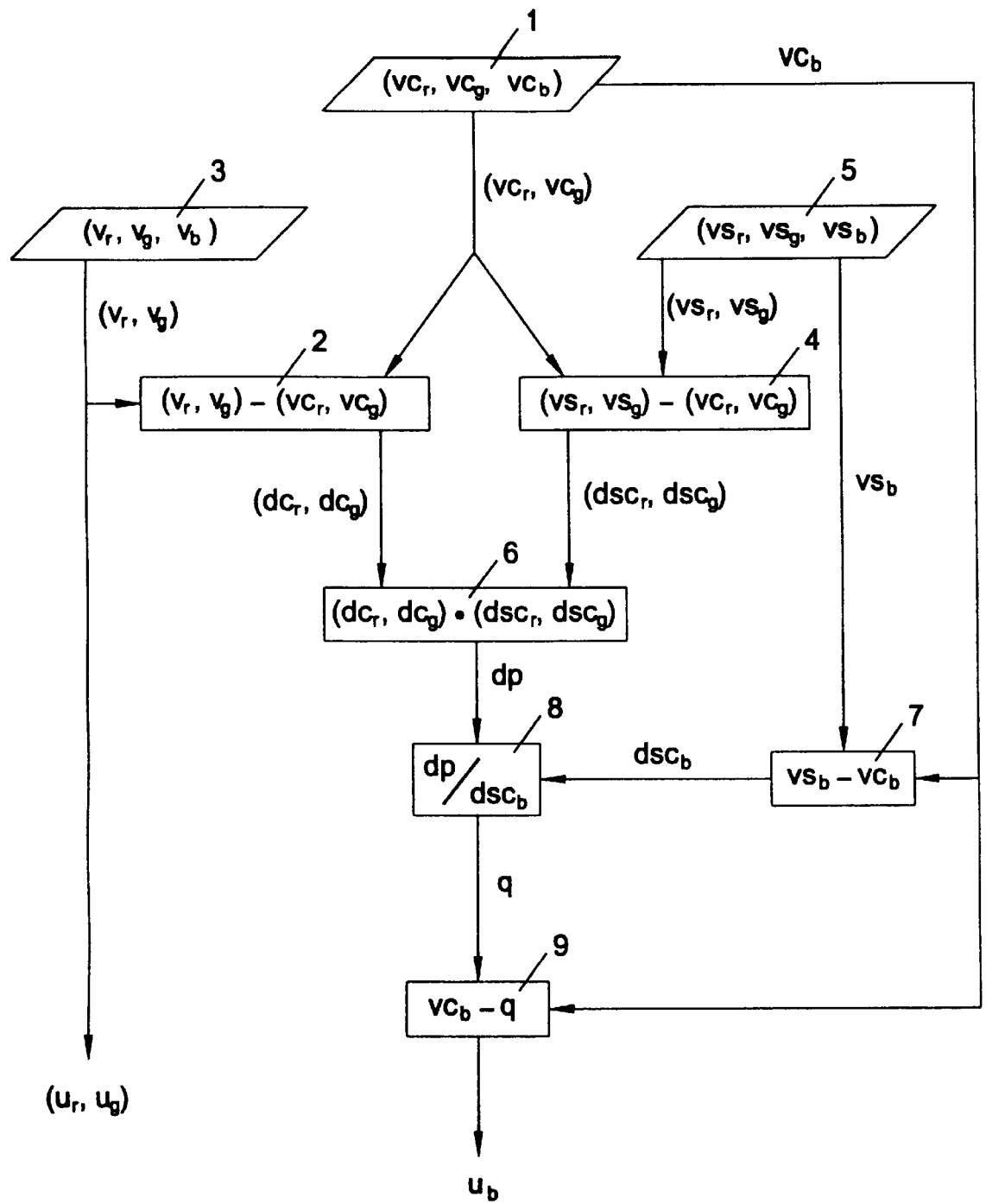
FIG. 7 is a detailed block diagram of a computation of a "straight" projection method shown as point 2 in FIG. 4 and FIG. 5.

FIG. 7 is a block diagram of this computation of a "straight" projection u of observed color point v [represented as (vr,vg,vb)] onto the plane passing through color point vc [represented as (vcr,vcg,vcb)] and orthogonal to the difference vector vc−vs, where vs can be represented as (vsr,vsg,vsb). The input vector (vcr,vcg) (from block 1) is subtracted (block 2) from the input vector (vr,vg) (from block 3) to produce difference vector (dcr,dcg). Similarly, the input vector (vcr,vcg) (from block 1) is subtracted (block 4) from the input vector (vsr,vsg) (from block 5) to produce difference vector (dscr,dscg). The dot product of (dcr,dcg) and (dscr,dscg) is computed (block 6), to produce the scalar dp. The input component vcb (from block 1) is subtracted (block 7) from the input component vsb (from block 5), to produce the scalar difference dscb. The scalar dp is divided (block 8) by the scalar dscb to produce the quotient q. The quotient q is subtracted (block 9) from the input component vcb (from block 1) to produce the adjusted output component ub. The output component ur is the input component vr, and the output component ug is the input component vg, completing the output vector (ur,ug,ub).

Another type of strategy assumes that the subject reference color estimate is sufficiently accurate, suggesting that the background reference color point be selected from a ray in color space which emanates from the subject reference color point and passes through the observed color point. The background reference color can then be any point on that ray which is further than the observed color point from the subject reference color point; i.e. any point $$u = v + w*(v - vs)$$

where w>=0.0.

Specifically, this can be the point of intersection of the above mentioned ray with the "surface of color space", the surface enclosing all possible colors: If using an RGB color space in which the value of each component ranges from 0.0 (lowest value) to 1.0 (highest value), the "surface of color space" consists of all points in which at least one of the point's RGB components is either 0.0 or 1.0—i.e. the sides of the RGB cube. Mathematically, the above mentioned point of intersection can be computed by solving each of the equations $$v_r + w_1*(v_r - vs_r) = 0.0$$

$$v_g + w_2*(v_g - vs_g) = 0.0$$

$$v_b + w_3*(v_b - vs_b) = 0.0$$

$$v_r + w_4*(v_r - vs_r) = 1.0$$

$$v_g + w_5*(v_g - vs_g) = 1.0$$

$$v_b + w_6*(v_b - vs_b) = 1.0$$

for its $w_i$, selecting the smallest nonnegative of the $w_i$'s as w, i.e.

w=min{$w_i | w_i >= 0$, 1<=i<=6} and using this w to compute u=v+w*(v-vs).

Figure 8:
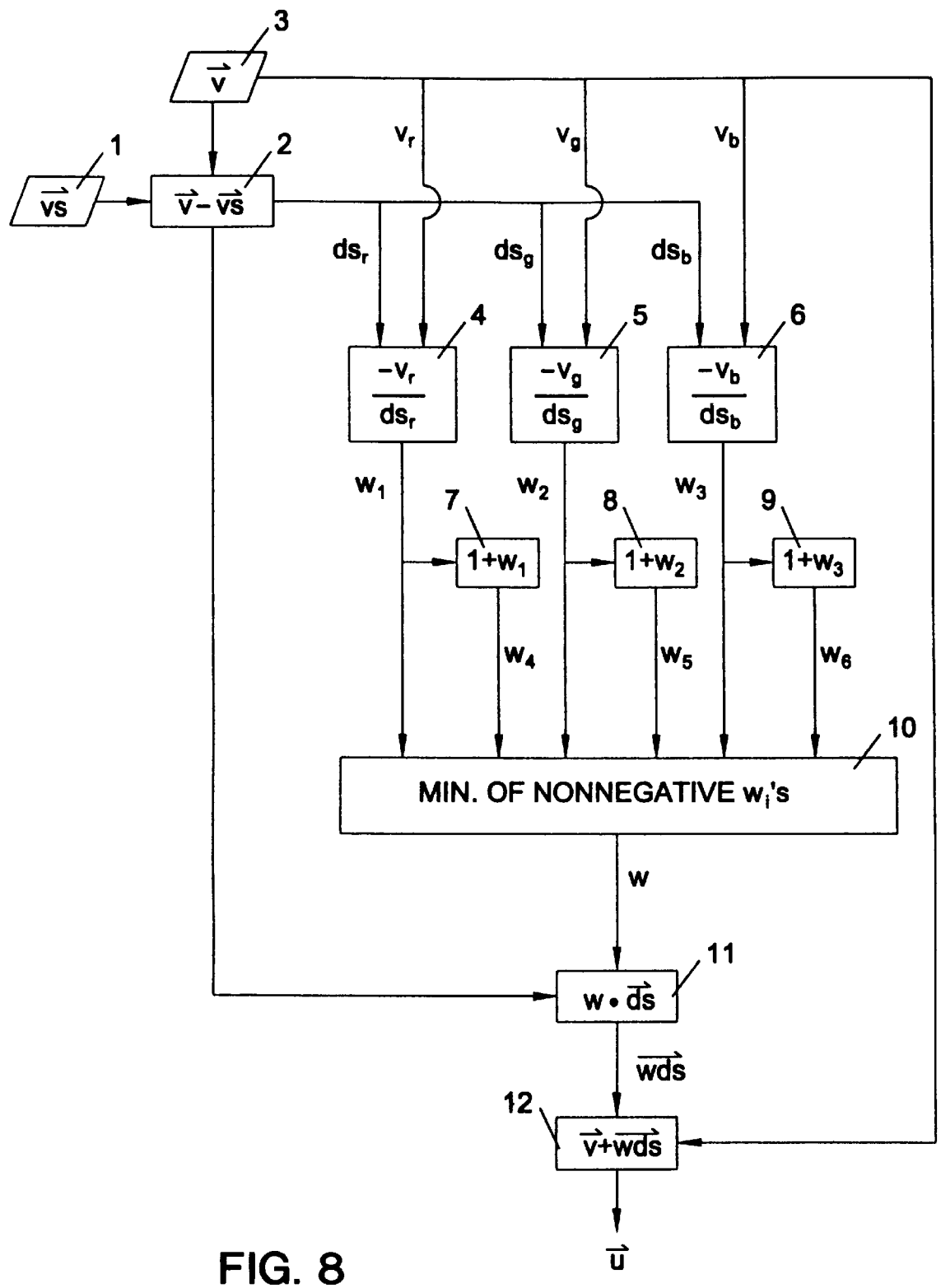
FIG. 8 is a detailed block diagram of a computation of the intersection of the "surface of color space" with the ray emanating from the reference color point and passing through the observed color, as illustrated by point 3 in FIG. 4 and FIG. 5.

FIG. 8 is a block diagram detailing this computation of the intersection of the "surface of color space" with the ray emanating from the reference color point vs and passing through the observed color v. The input vector vs (block 1) is subtracted (block 2) from the input vector v (block 3), producing the difference vector ds, or (dsr,dsg,dsb). Each component of the input vector v (block 3) is multiplied by −1 and divided (blocks 4, 5, and 6) by the corresponding component of the difference vector ds, producing scalar quotients w1, w2, and w3 respectively. The number 1 is added to w1 (block 7), to w2 (block 8) and to w3 (block 9) to produce w4, w5, and w6, respectively. The smallest nonnegative value from the set {w1,w2,w3,w4,w5,w6} is selected (block 10) to produce the weight w. The vector difference ds is then multiplied (block 11) by w to produce the weighted vector wds. wds is then added (block 12) to the input vector v (block 3) to produce the adjusted output vector u.

Alternatively, both types of strategies can be combined, selecting as a new background reference color estimate, the point of intersection of the above mentioned ray, with the plane defined in the previous type of strategy.

These strategies also apply to adjustment of the subject reference color point.

FIG. 5 is a graph of a two dimensional section of color space as in FIG. 4, but illustrating subject reference color adjustments 1, 2 and 3. These adjustments are obtained in the same manner as the corresponding adjustments of background reference color, by switching the roles of background reference and subject reference.

The first type of strategy, when applied to adjustment of the subject reference color point, is to project the observed color on a plane which passes through the initial subject reference color point and is perpendicular to the vector connecting that subject reference color point with the background reference color point. The second type of strategy, when applied to adjustment of the subject reference color point, assumes that the background reference color estimate is sufficiently accurate, suggesting that the subject reference color point be selected from a ray in color space which emanates from the background reference color point and passes through the observed color point—particularly the point of intersection of that ray with the surface of color space.

These strategies can also be applied to adjust reference colors of other specified proportions (of background and subject color).

When choosing between several reference color estimates or adjustments, such as a projection on a selected plane vs. a projection on the surface of color space, a good strategy is to choose the estimate which is closest to the observed color. If the two contending adjustments and the observed color are co-linear in color space—i.e. they lie on the same straight line—this strategy is clearly defined. Otherwise, a measure of closeness, such as a matte estimate, can be employed.

SHADOW EXTRACTION

In addition to designating an opaque subject region or a clear background region, a user can also designate a region in which the background and subject colors are mixed at some specified, fixed proportions. Perhaps the most common example would be a shadow region of uniform shadow density. Such a shadow region can be considered a linear mix of the background color and a subject color—the subject color in this case being black, and the weights in the linear mix are constant across the designated region (representing constant shadow density).

This designated "fully shaded" region, or region of specified fixed proportion of background and subject colors, can be used in precisely the same manner as a designated opaque subject region, to form a subject reference frame from which, together with a background reference frame (generated from a designated "clear of shadow" region) and the original image, a matte and processed foreground (the extracted subject) can be computed.

The matte so computed, yielding 0 inside the designated subject region and 1.0 in the clear region, would then require adjustment to reflect the fact that the designated subject region is not completely opaque. In the case of a shadow, all the information of interest is in the matte, and the processed foreground need not be computed. The adjustment of this computed shadow would then take the following form:

adjustedMatte=computedMatte(1.0−fullShadeMatte)+fullShadeMatte where the adjustedMatte is the final matte representing the shadow at its intended or estimated level, the fullShadeMatte is the matte level, typically a constant, intended or estimated for the fully shaded region, and the computedMatte is the matte computed from the reference frames and the observed color, as mentioned above.

The fullShadeMatte level is the complement of (i.e. 1.0 minus) the "shadow level". And so the adjusted matte can be expressed as adjustedMatte=computedMatte(shadowLevel)+1.0−shadowLevel adjustedMatte=1.0−shadowLevel(1.0−computedMatte)

In this form, the shadowLevel acts as a so-called "black gain" on the computed matte—i.e. a gain on its difference from 1.0.

In FIG. 1, the original image (block 1) is copied (block 2), and together with a designated interior-of-shadow region (block 3) the copy is presented to an interpolation/extrapolation procedure (block 4) which interpolates/extrapolates colors from within the designated region of the image copy into points in the image copy outside of the designated region, replacing the original colors in those external points, thus producing the interior-of-shadow colors frame. Similarly, the original image (block 1) is copied (block 5), and together with a designated clear-of-shadow region (block 6) the copy is presented to an interpolation/extrapolation procedure (block 7) which interpolates/extrapolates color from within the designated region of that image copy into points in the image copy outside of the designated region, replacing the original colors in those external points, thus producing the clear-of-shadow colors frame. The interior-of-shadow colors frame and the clear-of-shadow colors frame, together with the original image, are presented to a matte computation procedure (block 8) which uses them to compute a matte signal, or an estimate of the percent of the estimated clear-of-shadow color present in each pixel of the original image, i.e. which when combined with some percent of the interior-of-shadow color, produces the original observed color. This matte signal is a representation of the extracted shadow, the intensity of which can be optionally adjusted by a "black gain" procedure (block 9), and multiplied (block 10) with a new background image (block 11) to produce a composite of the new background image with the extracted shadow.

Figure 2:
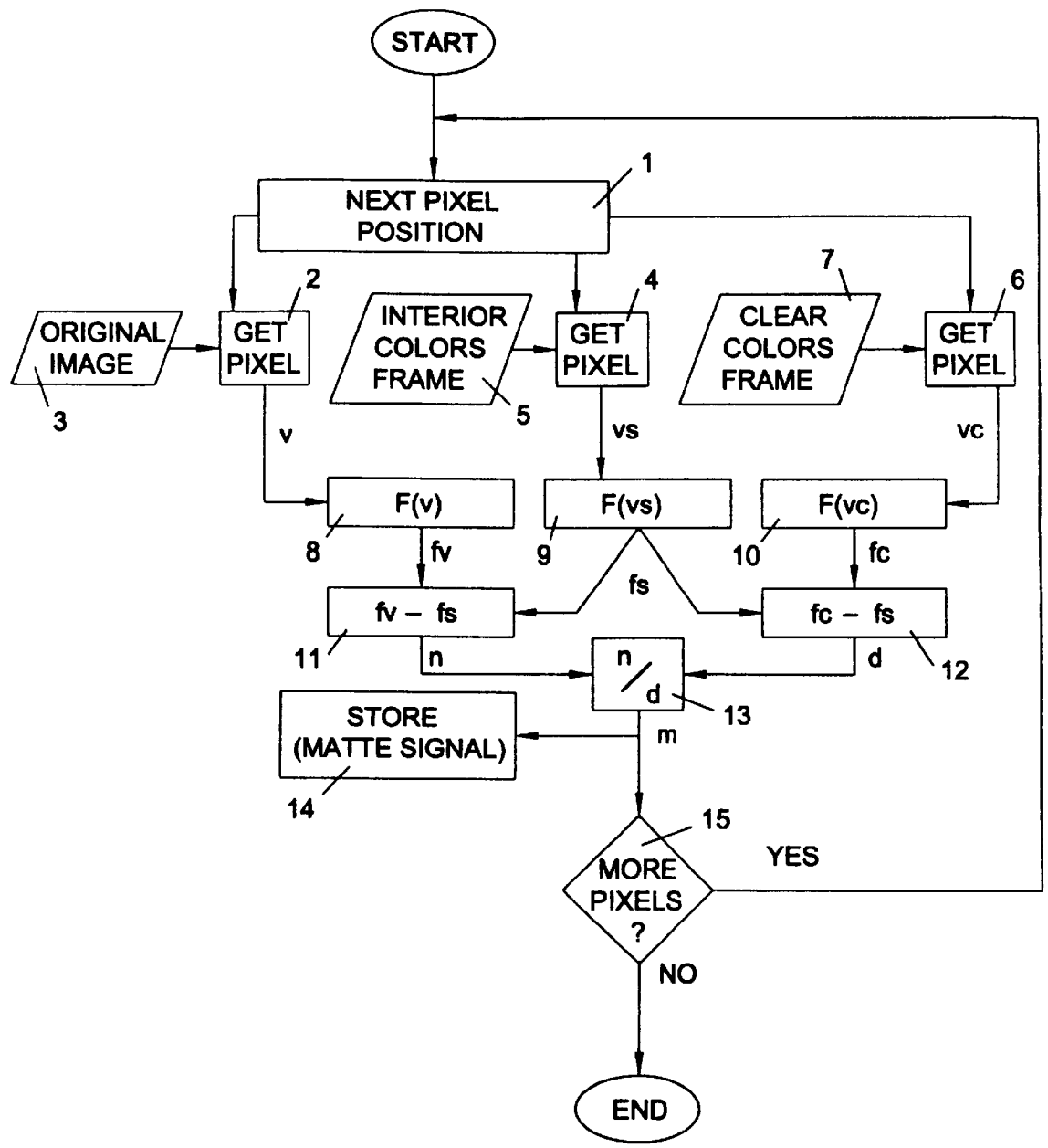
FIG. 2 is a detailed block diagram of a possible embodiment of the "compute matte" block of FIG. 1.

FIG. 2 is a block diagram showing detail of a possible embodiment of the "compute matte" block of FIG. 1. In FIG. 2, the next pixel position is determined (block 1) and used to get the next pixel (block 2) and its color v from the original image (block 3), the corresponding pixel (block 4) and its color vs from the interior-of-shadow colors frame (block 5), and the corresponding pixel (block 6) and its color vc from the clear-of-shadow colors frame (block 7). The same predetermined function F mapping each color into a scalar value is applied to observed color v (block 8) producing the scalar fv, to interior-of-shadow color vs (block 9) producing the scalar fs, and to clear-of-shadow color vc (block 10) producing scalar fc. fs is subtracted (block 11) from fv to produce the difference n, and fs is also subtracted (block 12) from fc to produce the difference d. The difference n is divided (block 13) by the difference d to form the quotient m, which is stored (block 14) as the next value in the matte signal buffer. If there are more pixels to be processed (block 15) this process (blocks 1 through 15) is repeated until all the pixels in the image have been processed.

If the level of the shadow in the original image can be estimated, the extracted shadow can then be adjusted to that level, represented by the "shadowLevel" black gain parameter, so that the shadow will retain that same level when placed on new backgrounds. The level of the shadow in the original image can be estimated by comparing, or more specifically, computing the ratio of the brightness of pixels in the interior region of the shadow to the brightness of neighboring pixels in the clear of shadow region, particularly pixels of the same color (hue and saturation). The estimated level of the shadow is then the complement of this computed ratio; i.e. it is 1.0 minus this ratio. Such an estimated level of the shadow, used as the value of the black gain parameter, can vary across the image, or be reduced to a single level by averaging.

Typically, a shadow extraction as described here would be a part of a larger project, which involves the extraction of an opaque subject, and its shadow (or shadows). Since the shadow can be extracted separately, it is not necessary to accommodate it in the extraction of the opaque subject. I.e. the part of the opaque subject's shadow which falls outside the subject region can be considered clear background in the process of extracting the opaque subject. If the process of extracting the opaque subject also yields a clear background image, from which the subject had been removed, this clear background image still contains much of the shadow. And so, while the shadow can be extracted from the original image, it can instead, alternatively, be extracted from this clear background image.

We claim:

1. A method to enable adjustment of estimates of subject and background colors used to compute the contribution of a background color to pixels in semitransparent and translucent subject areas, said method comprising the steps of:
   a) receiving visually identified semitransparent and translucent subject areas where a first estimated background color contribution, when subtracted from an image, does not fully remove the background, or removes all of the background and some of the subject,
   b) receiving a color selected from said subject or background based on a judgment by an operator as to whether at least one of:
      i) a poor estimate of the background color, and
      ii) a poor estimate of the subject color, is primarily responsible for generating an inaccurate matte in said identified semitransparent and translucent subject areas and storing said selected color in memory,
   c) injecting said stored selected color, based on an input from the operator, into at least one point in at least one of
      i) said judged subject, and
      ii) said judged background, which when interpolated/extrapolated, provides an improved estimate of the selected subject or background color contributing to the color in a transition pixel.

2. The method of claim 1 in which selected colors are injected into both background and subject frames.

3. The method of claim 1 in which a color selected for injection may first be adjusted in luminance, saturation and hue, by adjusting its RGB levels.

4. The method of claim 1 in which a selected color is injected into a translucent area of the subject, perceived to represent an incorrect luminance, hue or saturation.

5. The method of claim 1 in which a color selected by the operator for injection may be selected from anywhere in the image.

6. The method of claim 1 in which a selected background color is injected into an extrapolated/interpolated background frame.

7. The method of claim 1 in which a selected subject color is injected into an extrapolated/interpolated subject frame.

8. The method of claim 1 in which selected colors are injected into selected areas prior to any computed estimates of subject reference, background reference, or matte, said selected colors and areas selected by visually identifying semitransparent and translucent subject areas where the anticipated estimated background color contribution, when subtracted from the image, is not expected to fully remove the background, or else is expected to remove all of the background and some of the subject.

9. A method for adjusting a reference color R of specified proportions of background and subject colors by enabling selection of, as the adjusted reference color of the same specified proportions, the projection of an observed color point on to a plane in color space which passes through the initial reference color point R and is perpendicular to the vector connecting that reference color point R with a reference color point S of other specified proportions.

10. The method of claim 9, but in which said reference color R is the background reference color and said reference color S is the subject reference color.

11. The method of claim 9, but in which said reference color R is the subject reference color and said reference color S is the background reference color.

12. The method of claim 9, but in which said projection of said observed color point is an orthogonal projection.

13. The method of claim 9, but in which said projection of said observed color point is a "straight" projection, i.e. it is a point on said plane which is equal to the observed color point in two of the dimensions or color components.

14. A method for adjusting a reference color R of specified proportions by selecting, as the adjusted reference color of the same specified proportions, a point on the ray emanating from a reference color point S of other specified proportions, and passing through the observed color point, and is further than the observed color point from the reference color point S.

15. The method of claim 14, but in which said reference color R is the background reference color and said reference color S is the subject reference color.

16. The method of claim 14, but in which said reference color R is the subject reference color and said reference color S is the background reference color.

17. The method of claim 14, but in which said adjusted reference color is the point of intersection of said ray and a surface enclosing all possible colors.

18. The method of claim 14, but in which said adjusted reference color is the point of intersection of said ray and the plane passing through the initial said reference color point R and perpendicular to the vector connecting that initial reference color point R with said reference color point S.

19. A method for extracting a shadow from an image, said method comprising the steps of:
   a. receiving as an input a region of the image designated by an operator as the interior of the shadow, the fully shaded or shadowed region;
   b. receiving as an input a region of the image designated by an operator as being clear of shadow, and being a pure background region;
   c. estimating an interior of shadow color for each point in the image by interpolating/extrapolating colors from the designated interior of shadow region into the rest of the image area, optionally excluding the clear of shadow area;
   d. estimating a clear of shadow color for each point in the image by interpolating/extrapolating colors from the designated clear of shadow region into the rest of the image area, and selectively excluding the interior of shadow area;
   e. for each point or pixel position in the image, estimating a matte, or percentage of background color present in the pixel, by using an original observed color v, the designated or estimated interior of shadow color vs, and the designated or estimated clear of shadow color vc, by selecting from or combining matte estimates of the form
   $h(v-vs)/h(vc-vs)$ where h is a linear function.

20. The method of claim 19 further comprising the step of remapping the matte, or shadow, levels.

21. The method of claim 20, wherein said mapping is a linear mapping.

22. The method of claim 21, wherein said linear mapping effects a gain on the difference from 100%.

23. The method of claim 22, wherein the amount of gain is estimated from the original image as the complement of the ratio of the brightness of pixels in the interior region of the shadow to the brightness of neighboring pixels in the clear of shadow region.

24. The method of claim 19, wherein the image presented for shadow extraction is a clear background image produced from a prior extraction of another subject.

25. The method of claim 19, further comprising the step of removing the estimated background, or clear of shadow color, from each pixel, in accordance with, or in proportion indicated by, said estimated matte.

* * * * *